United States Patent [19]

Windsor

[11] 4,418,810
[45] Dec. 6, 1983

[54] CLUTCH CONTROL SYSTEM

[75] Inventor: Harry M. Windsor, Harbury, Leamington Spa, England

[73] Assignee: Automotive Products Limited, Leamington Spa, England

[21] Appl. No.: 279,085

[22] Filed: Jun. 30, 1981

[30] Foreign Application Priority Data

Jul. 8, 1980 [GB] United Kingdom ............... 8022348

[51] Int. Cl.³ ............................................. B60K 41/02
[52] U.S. Cl. ................................ 192/0.076; 192/3.58; 361/242
[58] Field of Search ............... 192/0.076, 0.075, 0.07, 192/0.033, 0.032, 0.052, 3.58, 103 R, 0.096; 74/866; 361/239, 242

[56] References Cited

U.S. PATENT DOCUMENTS

| | | | |
|---|---|---|---|
| 4,061,217 | 12/1977 | Toyota et al. | 192/0.076 |
| 4,086,992 | 5/1978 | Hamada et al. | 192/0.076 |
| 4,172,505 | 10/1979 | Rabus et al. | 192/0.076 X |
| 4,200,175 | 4/1980 | Dick | 192/0.033 |
| 4,286,306 | 8/1981 | Kraus et al. | 361/242 |
| 4,289,222 | 9/1981 | Esthimer | 192/0.076 X |
| 4,336,566 | 6/1982 | Noddings et al. | 361/239 |

FOREIGN PATENT DOCUMENTS 1120132 7/1968 United Kingdom .
1427039 3/1976 United Kingdom .

Primary Examiner—George H. Krizmanich
Attorney, Agent, or Firm—Kemon & Estabrook

[57] ABSTRACT

An electronic control system for a motor vehicle friction clutch and which has an electrical reference signal generator, an engine speed sensor and signal means, and a throttle position sensor which produces a signal indicative of throttle opening. The throttle signal is combined with the engine speed signal to form a modified engine speed signal and a comparator receives the modified engine speed signal and reference signal to produce an error signal derived from the two. A clutch position control is operated by the error signal to vary the state of engagement of the clutch to equalize the modified engine speed and reference signals.

3 Claims, 8 Drawing Figures

CLUTCH CONTROL SYSTEM

This invention relates to clutch control systems for the automatic control of the engagement of a motor vehicle friction clutch driven plate with a driving member on take up from a standing start.

According to this invention there is provided a vehicle transmission clutch control system comprising an electrical reference signal generator, an engine speed sensor which produce a signal indicative of engine speed, a throttle position sensor which produces a signal indicative of throttle opening and which is combined with the engine speed signal to form a modified engine speed signal, a comparator receiving the modified engine speed and reference signal to produce an error signal, and a clutch position control operated by the error signal to vary the state of engagement of the clutch to equalise said modified engine speed signal and reference signal.

Preferably the throttlle signal is an inverse relationship with the throttle opening so that at light throttle openings the signal is at a maximum and at full throttle the signal is at a minimum.

The invention will be described by way of example and with reference to the following drawings in which.

Figure 1:
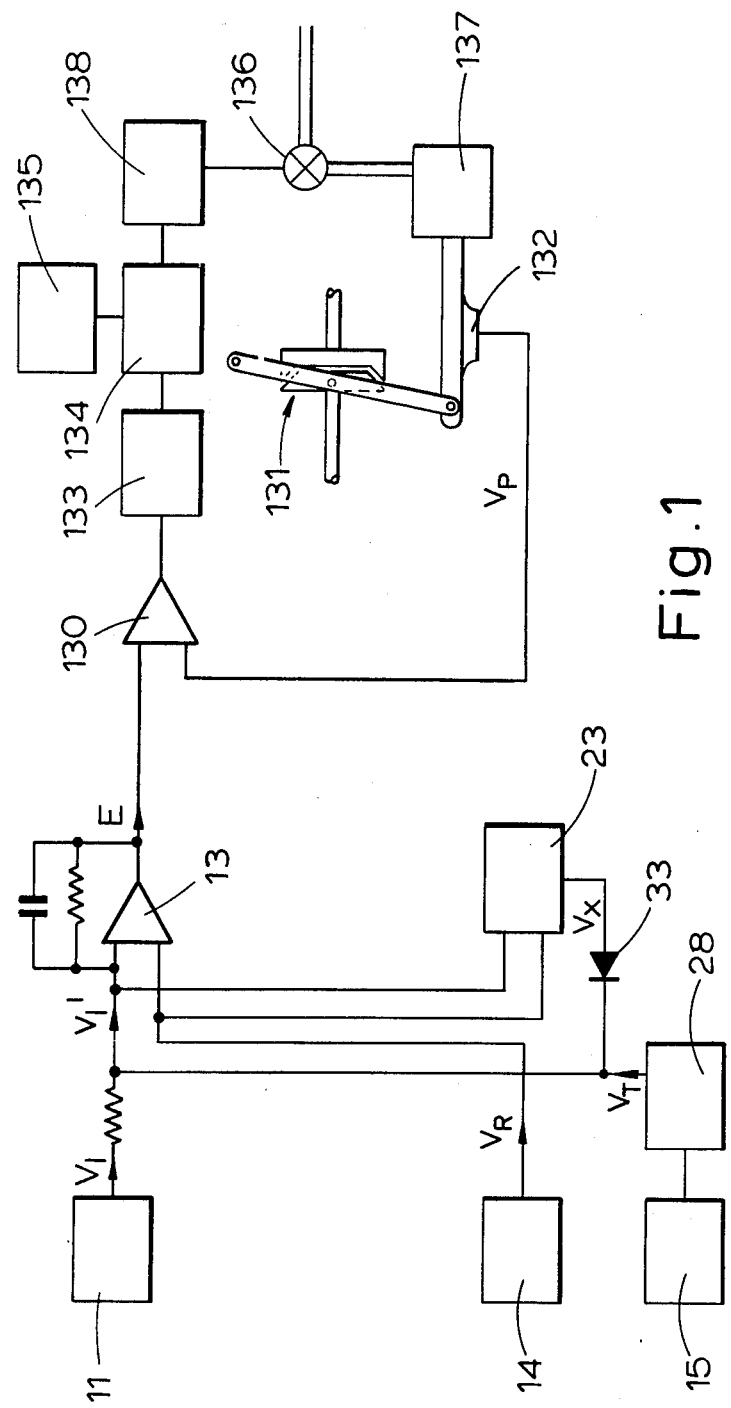
FIG. 1 is a schematic drawing of a clutch control system according to this invention.
Figure 2:
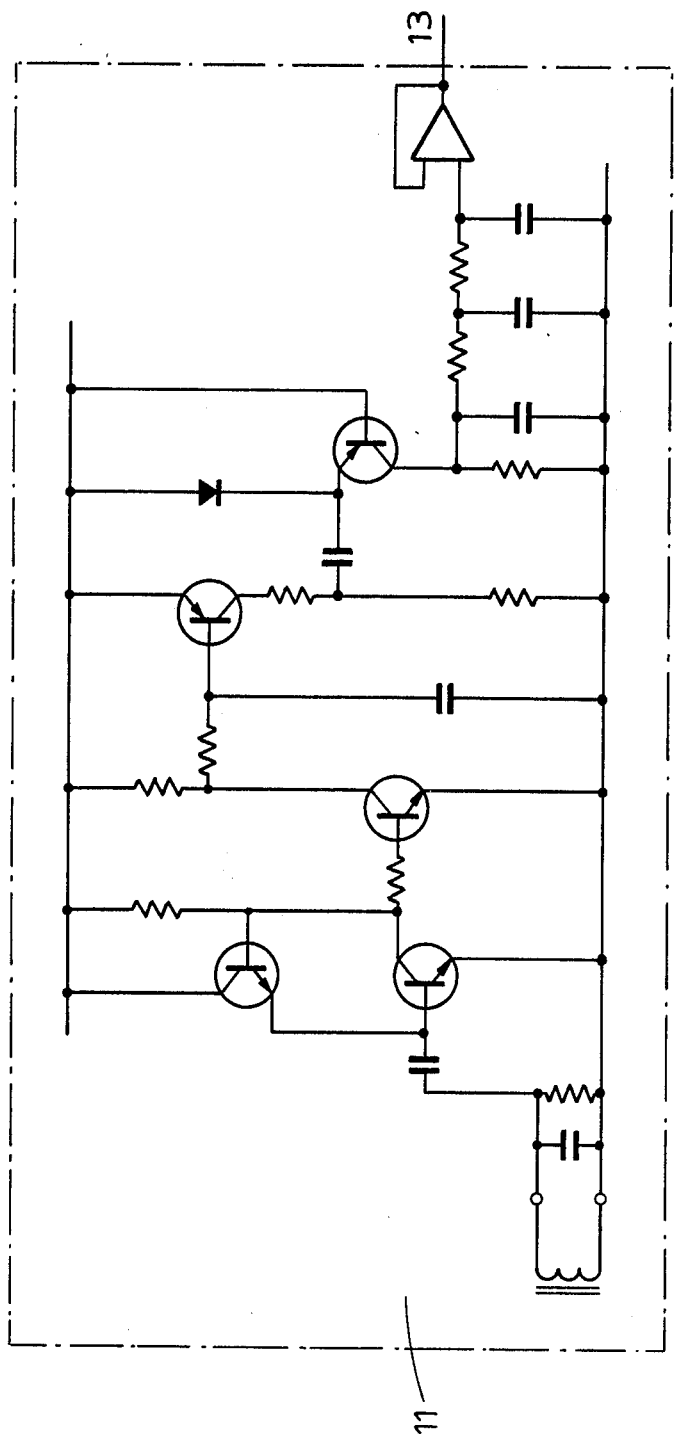
FIG. 2 is a detailed circuit of an engine speed sensor as is used in FIG. 1.
Figure 3:
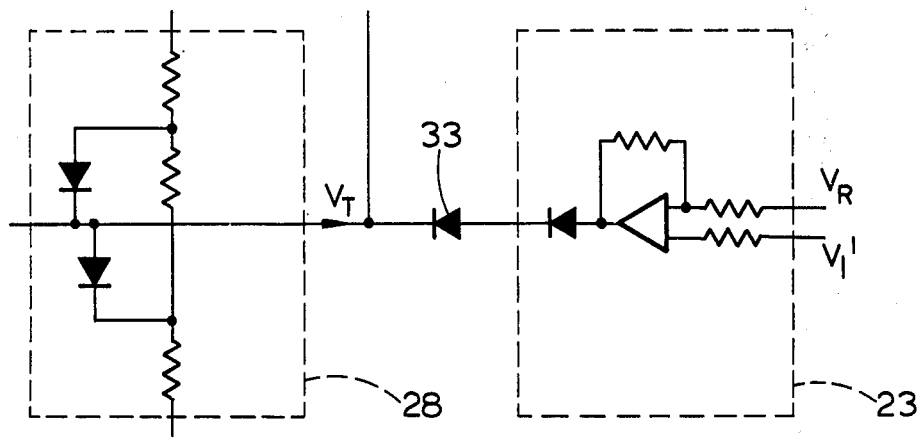
FIG. 3 is a detailed circuit of a limiter and trigger circuit as utilised in FIG. 1.
Figure 4:
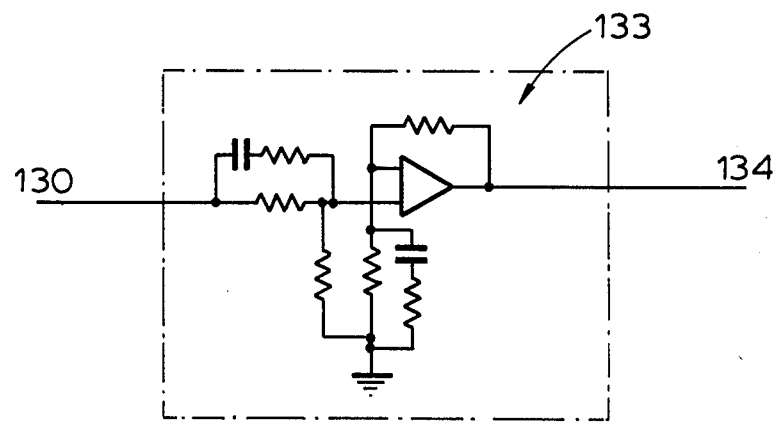
FIG. 4 is a detailed circuit of a phase gain shaping network utilised in FIG. 1.
Figure 5:
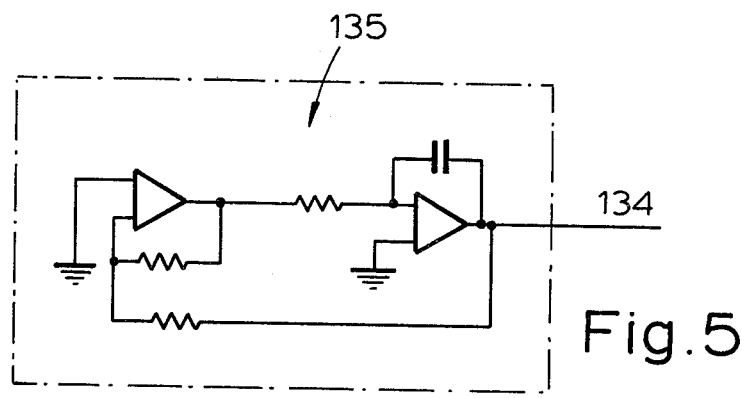
FIG. 5 is a detailed circuit of the oscillator of FIG. 1.
Figure 6:
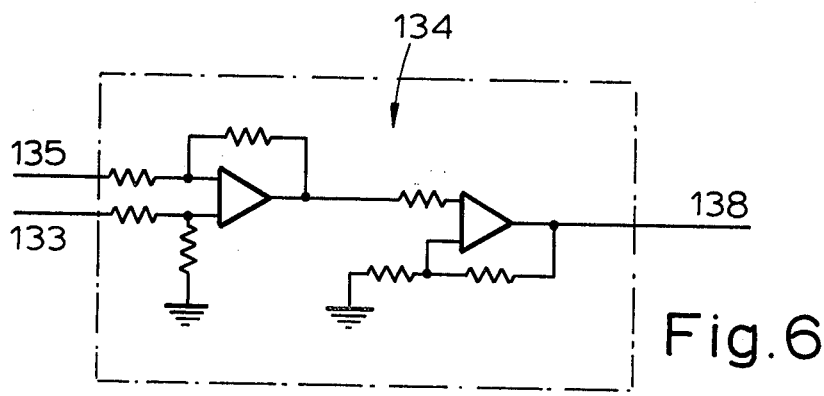
FIG. 6 is a detailed circuit of the mark space ratio modulator of FIG. 1.
Figure 7:
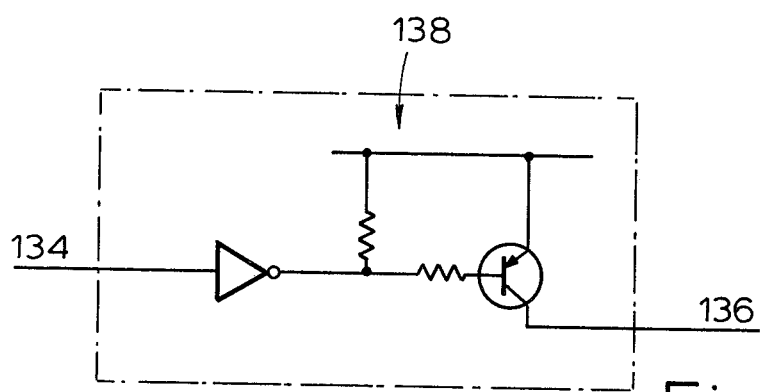
FIG. 7 is the output as used in FIG. 1.

The motor vehicle engine speed is sensed by a sensor 11 that produces a voltage $V_1$ proportional to engine speed. The detailed circuit of the sensor is shown in FIG. 3 and is basically a magnetic probe sensing the teeth on the engine flywheel and a transistor pump. The sensor is connected to a comparator 13 which also receives a reference signal $V_R$ from a reference signal generator 14. This can be, for example, a potentiometer across the vehicle battery so that the reference voltage is the same as a signal obtained from the sensor 11 at a particular engine speed e.g. 1000 r.p.m.

A throttle position transducer 15 in the form of a variable potentiometer produces a signal $V_T$ representative of throttle opening. The signal $V_T$ is made proportional to throttle closure i.e. at light throttle openings the signal is at a maximum and at full throttle openings the signal $V_T$ has a minimum value. This relationship can be written as $V_T = k$ (1-throttle opening). This inverse relationship between the signal $V_T$ and the throttle opening is utilised because the signal $V_T$ is required in this form to control other functions in the vehicle gearbox. The throttle position transducer 15 is connected to a limiter 28, the action of which is to allow the signal VT to vary only over a limited range say 10%–50% of throttle opening. The limiter 28 is shown in detail in FIG. 3. The signal $V_T$ is fed into the engine speed signal $V_1$ to form a modified engine speed signal $V_1^1$.

The comparator 13 receives the modified reference signal $V_1^1$ for comparison with the reference signal $V_R$ and produces an error signal E which is fed into a clutch position control which controls the operation of an actuator 137. The actuator 137 operates the vehicle clutch 131 and is powered by hydraulic pressure but could alternatively be pneumatic or electrical.

The clutch position control comprises a comparator 130 that receives the error signal E and a feed back signal $V_P$ from a travel transducer 132 responsive to the position of the clutch. The feed back signal $V_P$ is representative of the position of the clutch. The signal derived from the comparator 130 is fed into a phase gain shaping network 133, a mark space ratio modulator and oscillator 134 and 135, respectively, and is then utilised via output 138 to control a solenoid operated hydraulic valve 136. The hydraulic valve 136 controls hydraulic flow through the hydraulic actuator 137. The mark/space ratio of the signal fed into the solenoid valve 136 determines the hydraulic flow into the actuator and hence the rate of engagement of the clutch driven plate with its driving member. The shaping network 133, oscillator 135, mark/space ratio 134 modulation network and output 138 are shown in detail in FIGS. 4–7 respectively.

The actuator 137 operates so as to equalise the feed back signal $V_P$ with the error signal E. Consequently the actuator 137 takes up a position dictated by the error signal E and which is proportional to the value of the error signal E.

A comparator trigger circuit 23 is connected between the reference signal $V_R$ and the modified engine speed signal $V_1^1$. The trigger circuit actuates when $(V_1 + V_T)$ $V_R$ and it modifies the throttle signal $V_T$ with an output signal $V_X$ as described hereinafter.

The clutch position control operates the actuator 137 during clutch take up to vary the state of engagement of the clutch driven plate with driving member on the vehicle engine (not shown) and thereby alter the engine speed to cause the modified engine speed signal $V_1^1$ to approach equivalence with the reference signal $V_R$ and make the error signal E approach zero, when the signal $V_1^1$ is lower than the reference signal $V_R$ the clutch is disengaged, and when the signal $V_1^1$ exceeds $V_R$ the error signal changes its polarity and the clutch loads the vehicle engine to cause the engine speed to decrease and make $V_1^1 = V_R$ at which point the error signal tends to approach zero.

Hence for a given throttle opening during clutch take up the clutch engagement will arrive at the condition where $V_1^1 = V_R$. Once the clutch is fully engaged the engine speed can rise above the reference and the clutch control will hold the clutch fully engaged.

From a standing start with the vehicle engine idling $V_T$ is equal to some constant value, say 11 volts, and therefore, since $V_1$ is very low, $V_1^1$ is just less than $V_R$ and the clutch is fully disengaged. As the driver increases the throttle opening the engine speed increases and $V_1$ causes the signal $V_1^1$ to equalise $V_R$ at say 1000 r.p.m., the error signal E goes to zero, and the clutch control begins to engage the driven plate with vehicle engine driving member.

Figure 8:
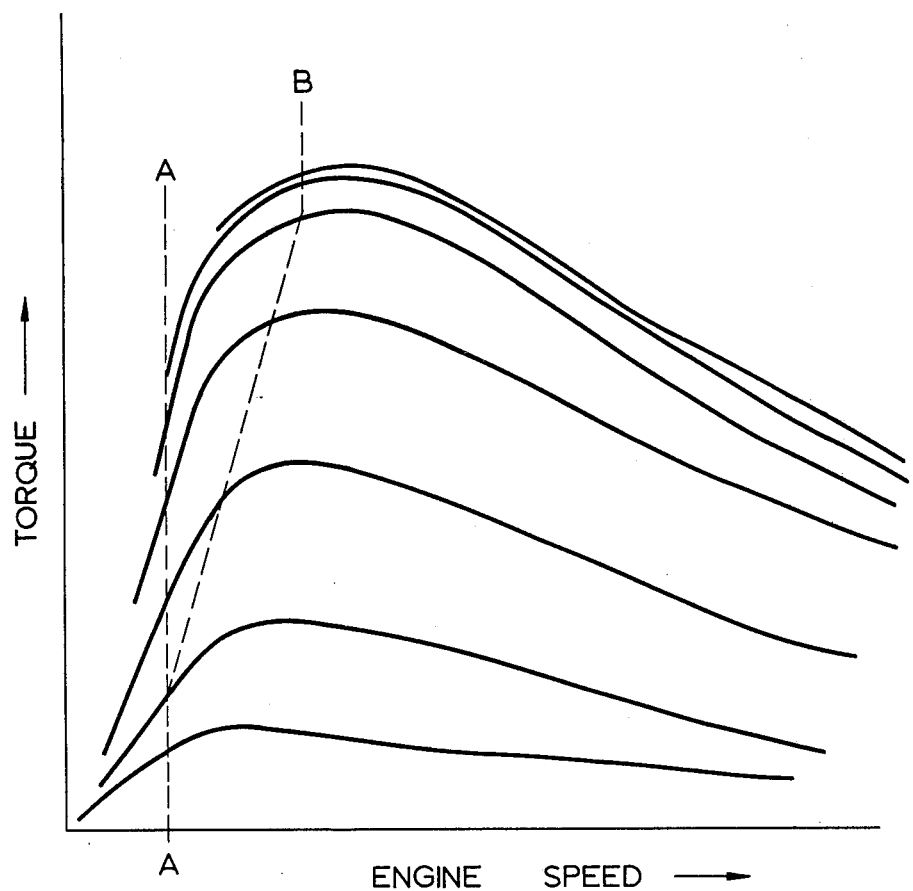
FIG. 8 is a graph of engine torque vs. engine speed.

Now with the vehicle stationary, as the throttle is opened to make the vehicle move off $V_T$ gets smaller and hence the engine speed signal $V_1$ must be higher before the clutch begins to engage. This causes the engine speed to become higher before the clutch engages. Therefore if the vehicle is under load on a hill then the clutch will not engage until the engine has developed enough torque to accelerate the load. With reference to FIG. 8 the graph shows the torque output against engine speed curves for various throttle openings. The line A represents a fixed take up speed and the line B represents the take up speed being variable with throttle opening, therefore allowing greater torque output from the engine at the clutch engagement.

On vehicle take-off, initially when the clutch is disengaged the modified signal $V_1^1$ is below the reference signal $V_R$ so that the trigger circuit 23 receives a low input signal and the trigger circuit is dormant and is isolated from the throttle signal $V_T$ by a diode 33. When the clutch engagement is complete and $V_1^1$ exceeds $V_R$ the trigger circuit is energised and its output $V_X$ goes positive so that this pulls the throttle signal $V_T$ upto a value similar to that of a light throttle value. This is accomplished via diode 33. The effect of this is that if the engine load increased after synchronisation e.g. on a hill start, the clutch will not slip until the engine speed drops below the original engagement speed.

I claim:

1. A vehicle transmission clutch electronic control system comprising:

generator means producing an electrical reference signal;

sensor means for producing a signal representative of engine speed;

a throttle position sensor means which produces a throttle signal indicative of throttle opening, said throttle signal and engine speed signal being combined to form a modified engine speed signal;

comparator means arranged to receive and compare the modified engine speed and reference signals and produce a consequent error signal;

a clutch actuator that operates the vehicle clutch and a control means responsive to the error signal and which causes the actuator to vary the state of engagement of the clutch to equalise the modified engine speed signal and reference signal.

2. A system as claimed in claim 1, wherein the throttle signal has an inverse relationship with the throttle opening so that at light throttle openings the signal is at a maximum and at full throttle the signal is at a minimum.

3. A system as claimed in claim 1 or 2, wherein a comparator trigger circuit is connected between the reference signal and the modified engine speed signal so that when the trigger circuit is energised by a predetermined imbalance between the two signals the trigger circuit output signal is fed into the throttle position sensor signal.

* * * * *